US012803812B2

(12) United States Patent
Valkaitis

(10) Patent No.: US 12,803,812 B2
(45) Date of Patent: *Nov. 17, 2026

(54) OPTIMIZED ACCESS IN A SERVICE ENVIRONMENT

(71) Applicant: UAB 360 IT, Vilnius (LT)

(72) Inventor: Mindaugas Valkaitis, Vilnius (LT)

(73) Assignee: UAB 360 IT, Vilnius (LT)

( * ) Notice: Subject to any disclaimer, the term of this patent is extended or adjusted under 35 U.S.C. 154(b) by 49 days.

This patent is subject to a terminal disclaimer.

(21) Appl. No.: 18/744,591

(22) Filed: Jun. 14, 2024

(65) Prior Publication Data

US 2024/0340182 A1 Oct. 10, 2024

Related U.S. Application Data

(63) Continuation of application No. 17/837,792, filed on Jun. 10, 2022, now Pat. No. 12,052,367, which is a continuation of application No. 17/837,003, filed on Jun. 9, 2022, now Pat. No. 11,528,144.

(51) Int. Cl.

| | |
|---|---|
| ***H04L 9/40*** | (2022.01) |
| ***H04L 9/08*** | (2006.01) |
| ***H04L 9/32*** | (2006.01) |

(52) U.S. Cl.

CPC .......... *H04L 9/3231* (2013.01); *H04L 9/0825* (2013.01); *H04L 9/3228* (2013.01); *H04L 9/3247* (2013.01); *H04L 63/0861* (2013.01)

(58) Field of Classification Search

CPC ... H04L 9/3231; H04L 9/0825; H04L 9/3228; H04L 9/3247; H04L 63/0861

See application file for complete search history.

(56) References Cited

U.S. PATENT DOCUMENTS

| | | | | |
|---|---|---|---|---|
| 6,567,914 | B1 | 5/2003 | Just et al. | |
| 7,315,948 | B1 | 1/2008 | Peyravian et al. | |
| 8,566,952 | B1 * | 10/2013 | Michaels | G06F 21/6218 726/30 |
| 8,745,654 | B1 | 6/2014 | Chaudhry et al. | |
| 9,286,457 | B2 * | 3/2016 | Beatson | H04L 9/3231 |
| 9,660,969 | B2 * | 5/2017 | Qian | H04L 63/0823 |
| 9,736,145 | B1 | 8/2017 | Hayes et al. | |

(Continued)

FOREIGN PATENT DOCUMENTS

WO WO-2023057652 A1 * 4/2023 ............... H04L 9/14

*Primary Examiner* — Ghodrat Jamshidi

(74) *Attorney, Agent, or Firm* — The Pattani Law Group

(57) ABSTRACT

A method including configuring, by an infrastructure device, a user device to receive validation data based at least in part on transmitting a first service request to receive a first network service; configuring, by the infrastructure device, the user device to receive the first network service based at least in part on signing the validation data using a signature key and on authenticating first biometric information; configuring, by the infrastructure device, the user device to transmit, while receiving the first service, a second service request to receive encrypted content; and configuring, by the infrastructure device, the user device to decrypt the encrypted content based at least in part on utilizing a master key and on authenticating second biometric information is disclosed. Various other aspects are contemplated.

20 Claims, 7 Drawing Sheets

(56) References Cited

U.S. PATENT DOCUMENTS

| | | | |
|---|---|---|---|
| 10,205,709 | B2 | 2/2019 | John et al. |
| 10,205,711 | B2 * | 2/2019 | Mennes ................ H04L 9/3228 |
| 10,462,132 | B1 * | 10/2019 | Brown .................. G06F 21/313 |
| 10,623,386 | B1 * | 4/2020 | Bernat .................. H04L 63/061 |
| 10,764,752 | B1 | 9/2020 | Avetisov et al. |
| 11,232,449 | B1 | 1/2022 | Hecht |
| 11,681,637 | B2 | 6/2023 | Shin et al. |
| 12,111,899 | B2 * | 10/2024 | Behm ..................... G06F 21/44 |
| 2003/0084306 | A1 | 5/2003 | Abburi et al. |
| 2003/0120925 | A1 | 6/2003 | Rose et al. |
| 2004/0054792 | A1 | 3/2004 | Pitsos |
| 2004/0098609 | A1 | 5/2004 | Bracewell et al. |
| 2004/0199770 | A1 | 10/2004 | Roskind |
| 2009/0150671 | A1 | 6/2009 | Abe |
| 2011/0252229 | A1 | 10/2011 | Belenkiy et al. |
| 2013/0081119 | A1 * | 3/2013 | Sampas ............ G06Q 20/40145 726/7 |
| 2015/0178548 | A1 * | 6/2015 | Abdallah ............ G06F 21/6209 382/124 |
| 2016/0054865 | A1 * | 2/2016 | Kerr ........................ H04L 67/55 715/739 |
| 2016/0182491 | A1 | 6/2016 | Jia et al. |
| 2016/0352524 | A1 | 12/2016 | Kinney et al. |
| 2017/0053123 | A1 | 2/2017 | Sitrick et al. |
| 2017/0193207 | A1 * | 7/2017 | Ashley .................... G06F 21/32 |
| 2018/0009416 | A1 * | 1/2018 | Maiwand ........... G07C 9/00896 |
| 2018/0068111 | A1 | 3/2018 | Chen et al. |
| 2019/0095911 | A1 | 3/2019 | Narasimhan et al. |
| 2019/0215164 | A1 | 7/2019 | Hamann et al. |
| 2019/0370441 | A1 | 12/2019 | Eldefrawy et al. |
| 2021/0226933 | A1 * | 7/2021 | Puzeris ............... H04L 63/0442 |
| 2021/0234858 | A1 | 7/2021 | Nakagawa et al. |
| 2021/0241266 | A1 | 8/2021 | Kamal et al. |
| 2021/0266158 | A1 | 8/2021 | Hirschberg et al. |
| 2022/0078020 | A1 | 3/2022 | Banchelin et al. |
| 2022/0104013 | A1 * | 3/2022 | Lamberton ........... H04W 12/02 |
| 2022/0116776 | A1 | 4/2022 | Spangler et al. |
| 2022/0144208 | A1 * | 5/2022 | Wale .................. G07C 9/00563 |
| 2023/0134651 | A1 * | 5/2023 | Agbamu .............. G06V 40/172 705/325 |
| 2023/0198751 | A1 | 6/2023 | Medvinsky et al. |

* cited by examiner

OPTIMIZED ACCESS IN A SERVICE ENVIRONMENT

CROSS REFERENCE

This application is a continuation of U.S. Non-Provisional patent application Ser. No. 17/837,792, filed on Jun. 10, 2022, and titled "Optimized Access In A Service Environment," which is a continuation of U.S. Non-Provisional patent application Ser. No. 17/837,003, filed on Jun. 9, 2022, and titled "Optimized Access In A Service Environment," the entire contents of which applications are incorporated herein by reference.

FIELD OF DISCLOSURE

Aspects of the present disclosure generally relate to use of computer hardware and/or software for providing and obtaining network services, and in particular to providing optimized access in a service environment.

BACKGROUND

Various methods of cryptography (e.g., encrypting and decrypting data) are known. Encryption may be associated with changing the data from being in a transparently readable format to being in an encoded, unreadable format with the help of an encryption algorithm. Decryption may be associated with changing the data from being in the encoded, unreadable format to being in the transparently readable format with the help of a decryption algorithm. Encrypted data may be decrypted with a given decryption key. In an example, symmetric cryptography may utilize encryption and decryption algorithms that rely on a single private key for encryption and decryption of data. Symmetric cryptography is considered to be relatively speedy. One example of an encryption and decryption algorithm utilized by symmetric encryption may be an AES encryption cipher. On the other hand, asymmetric cryptography may utilize encryption and decryption algorithms that rely on two separate but mathematically-related keys for encryption and decryption of data. For instance, data encrypted using a public key may be decrypted using a separate but mathematically-related private key. The public key may be publicly available through a directory, while the private key may remain confidential and accessible by only an owner of the private key. Asymmetric encryption may also be referred to as public key cryptography. One example of an encryption and decryption algorithm utilized by asymmetric encryption may be Rivest-Shamir-Adleman (RSA) protocol.

SUMMARY

In one aspect, the present disclosure contemplates a method including transmitting, by a processor associated with a user device, a request to determine a signature key; receiving, by the processor, a unique identifier associated with the signature key; authenticating, by the processor, received biometric information; selectively transmitting, by the processor based at least in part on a result of authenticating the biometric information, a signature request that includes the unique identifier in association with validation data to indicate that the signature key, associated with the unique identifier, is to be utilized to sign the validation data; and receiving, by the processor, signed validation data that is signed based at least in part on utilizing the signature key.

In another aspect, the present disclosure contemplates a device comprising a memory and a processor communicatively coupled to the memory, the processor being configured to: transmit a request to determine a signature key; receive a unique identifier associated with the signature key; authenticate received biometric information; selectively transmit, based at least in part on a result of authenticating the biometric information, a signature request that includes the unique identifier in association with validation data to indicate that the signature key, associated with the unique identifier, is to be utilized to sign the validation data; and receive signed validation data that is signed based at least in part on utilizing the signature key.

In another aspect, the present disclosure contemplates a non-transitory computer readable medium storing instructions, which when executed by a processor cause the processor to: transmit a request to determine a signature key; receive a unique identifier associated with the signature key; authenticate received biometric information; selectively transmit, based at least in part on a result of authenticating the biometric information, a signature request that includes the unique identifier in association with validation data to indicate that the signature key, associated with the unique identifier, is to be utilized to sign the validation data; and receive signed validation data that is signed based at least in part on utilizing the signature key.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
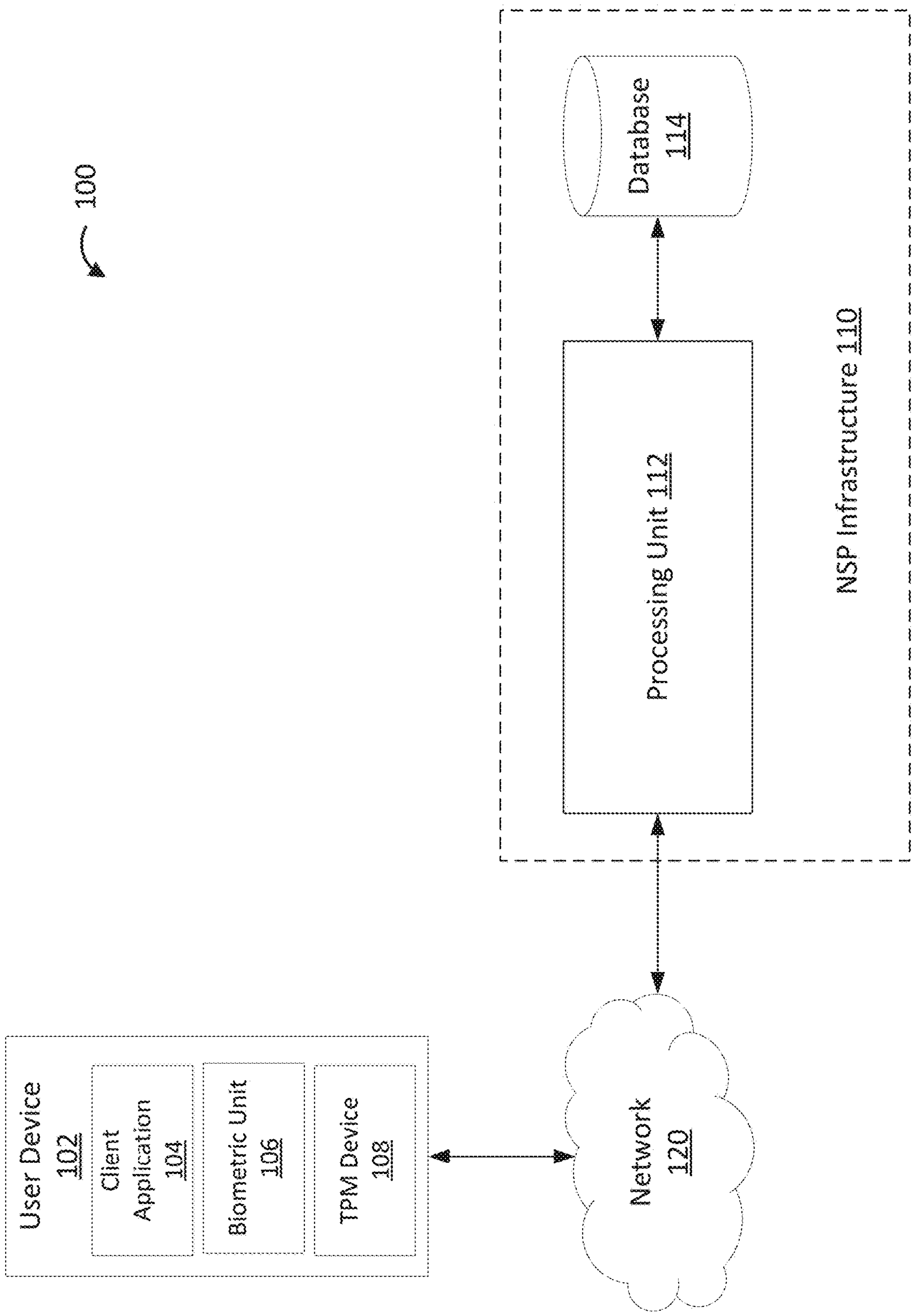

FIG. 1 is an illustration of an example system associated with optimized access in a service environment, according to various aspects of the present disclosure.

Figure 2:
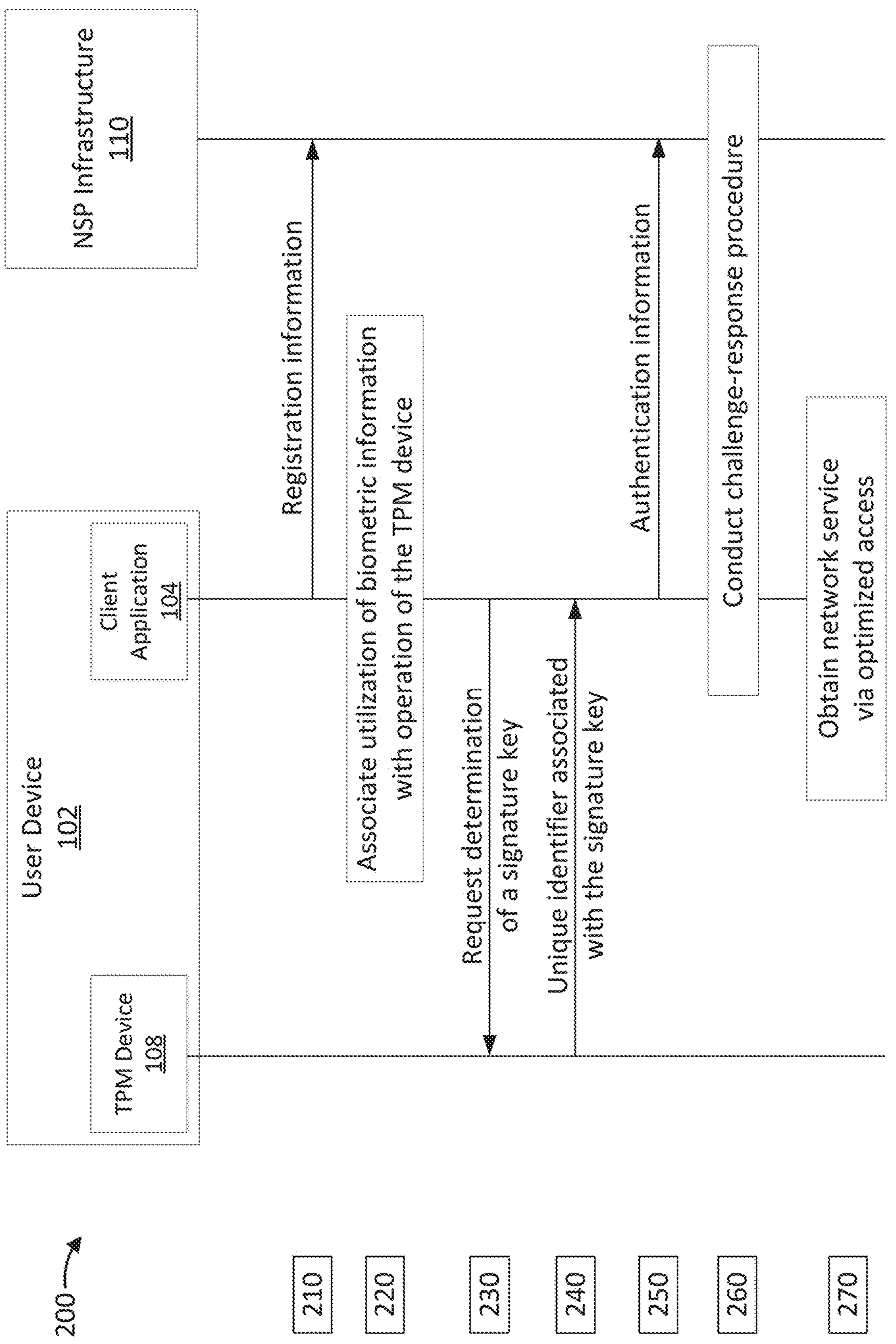

FIG. 2 is an illustration of an example flow associated with optimized access in a service environment, according to various aspects of the present disclosure.

Figure 3:
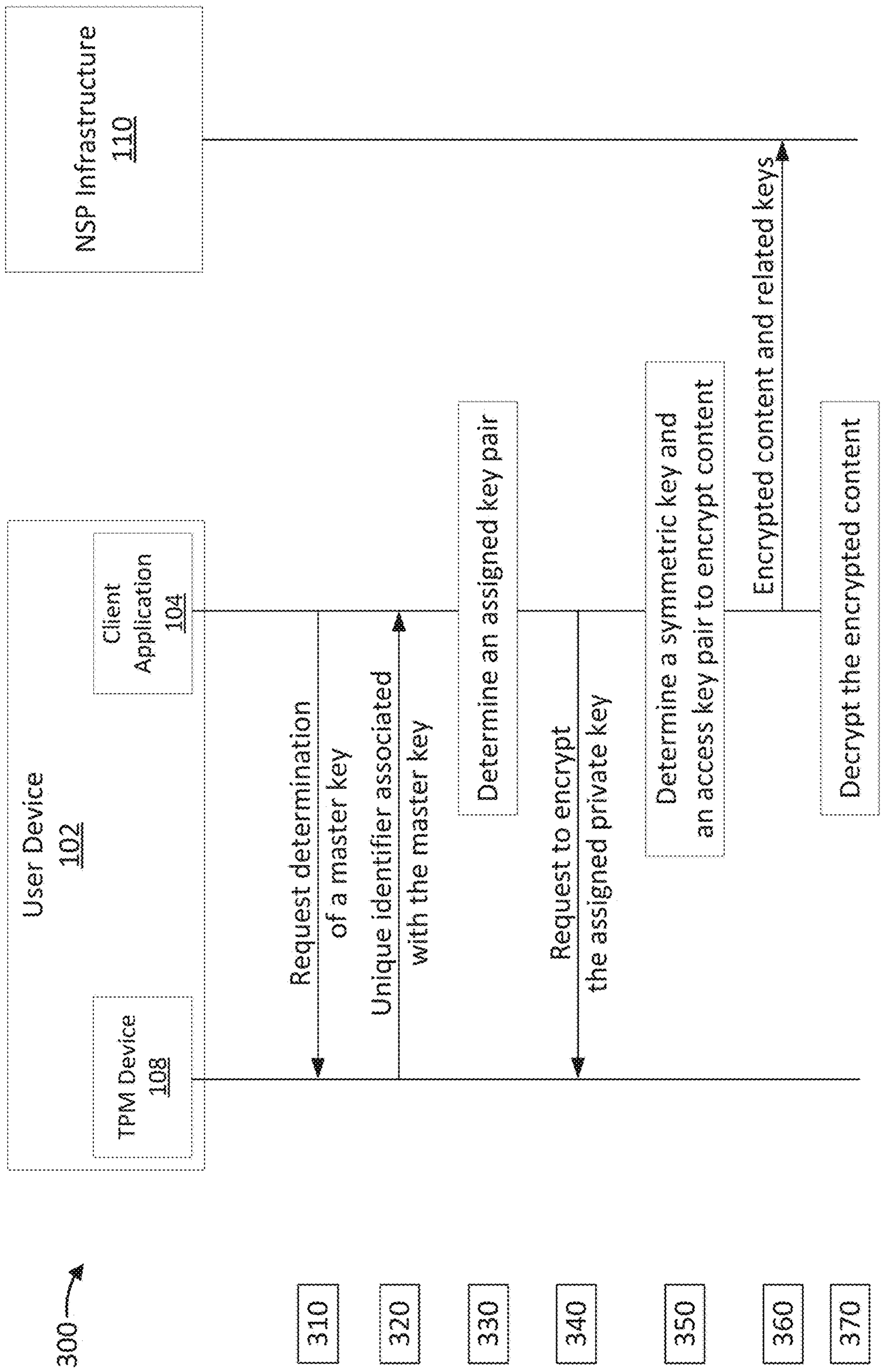

FIG. 3 is an illustration of an example flow associated with optimized access in a service environment, according to various aspects of the present disclosure.

Figure 4:
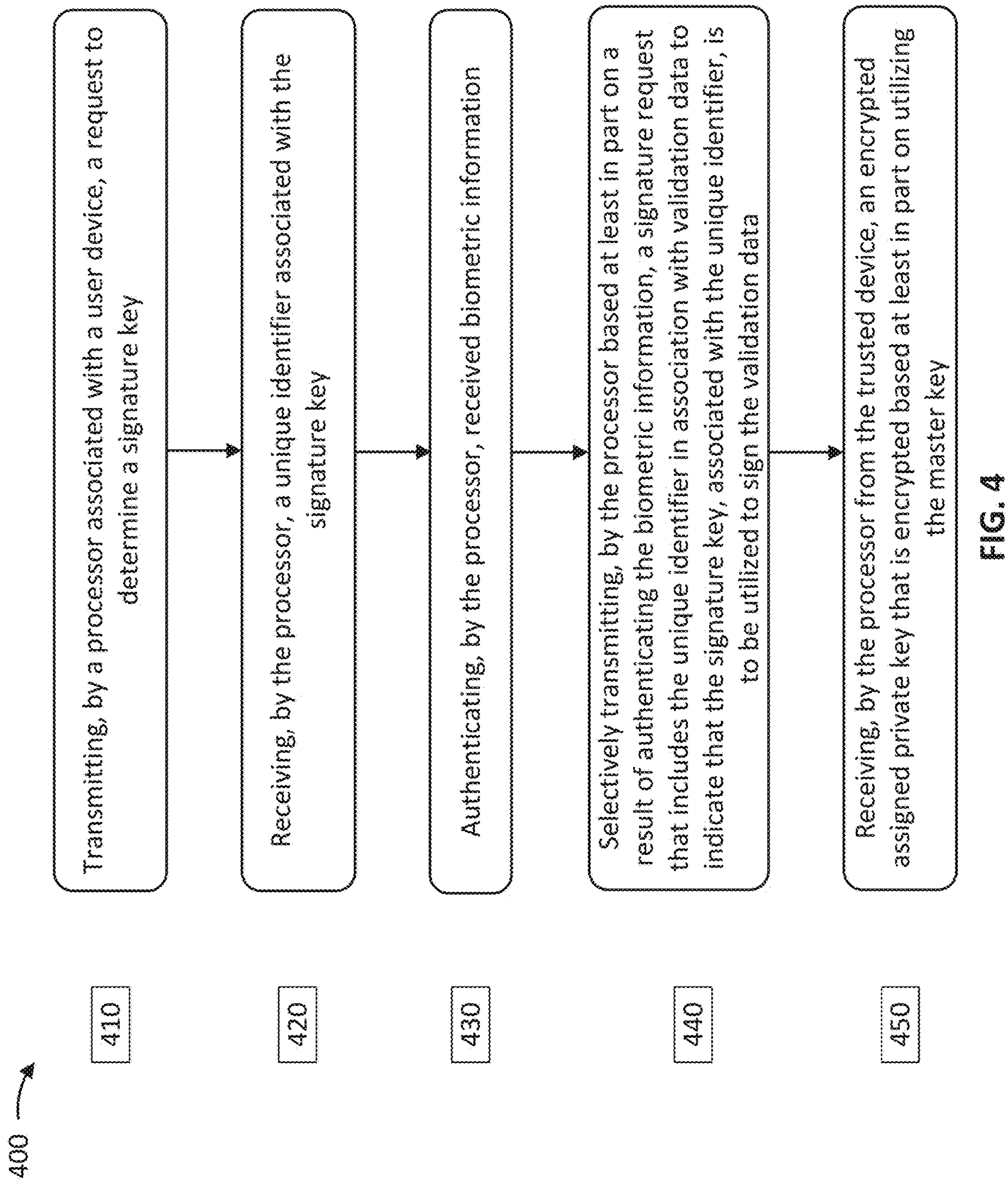

FIG. 4 is an illustration of an example process associated with optimized access in a service environment, according to various aspects of the present disclosure.

Figure 5:
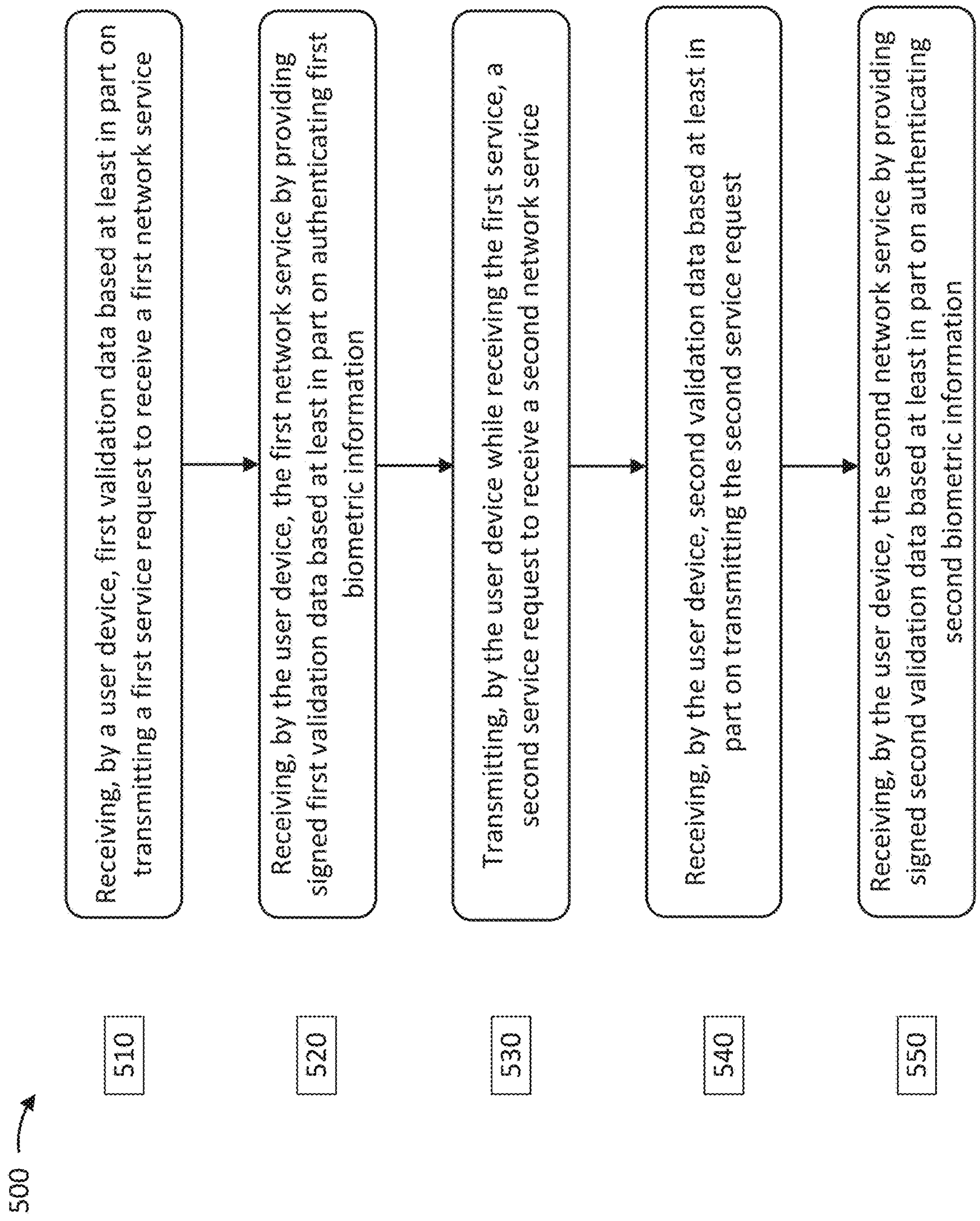

FIG. 5 is an illustration of an example process associated with optimized access in a service environment, according to various aspects of the present disclosure.

Figure 6:
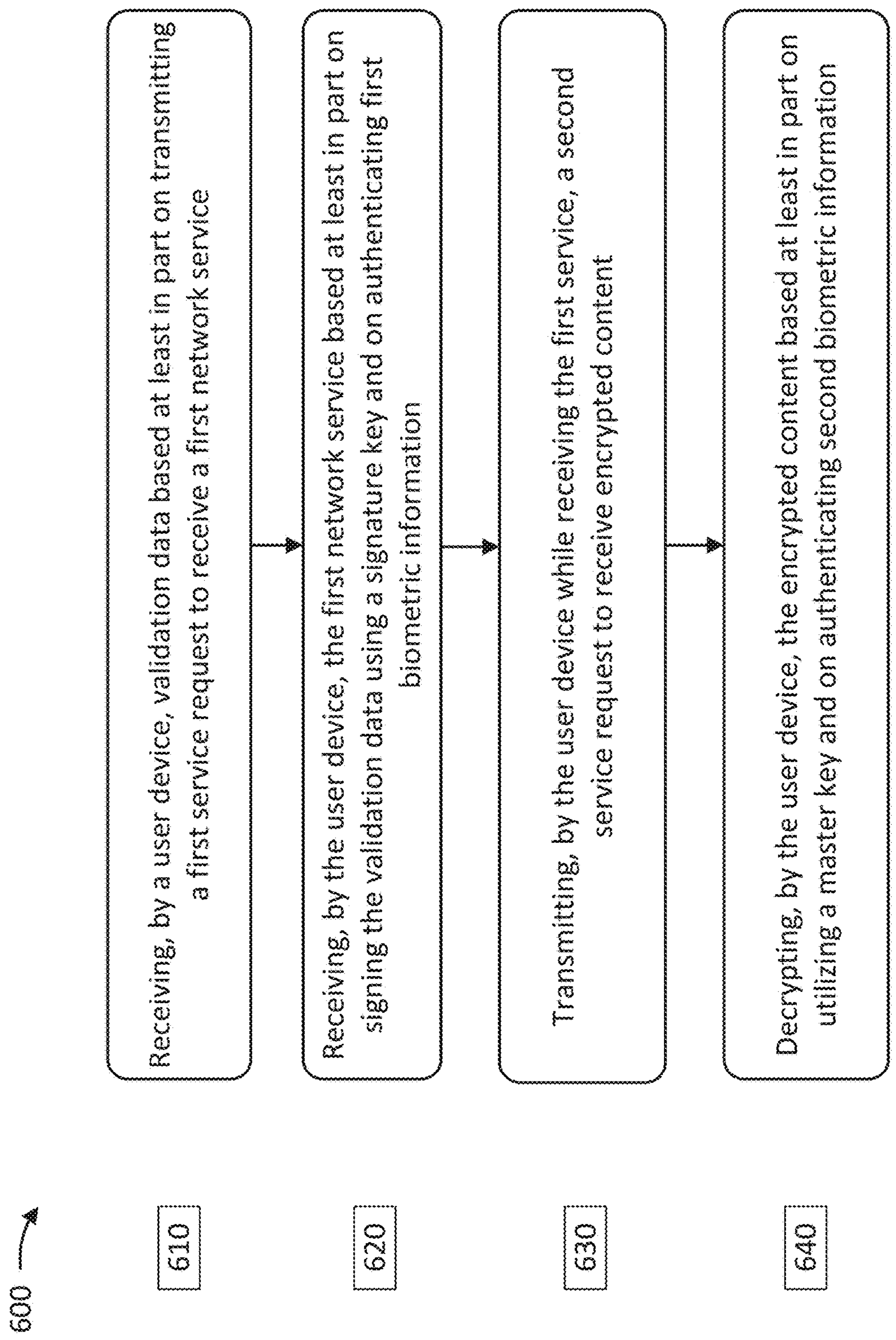

FIG. 6 is an illustration of an example process associated with optimized access in a service environment, according to various aspects of the present disclosure.

Figure 7:
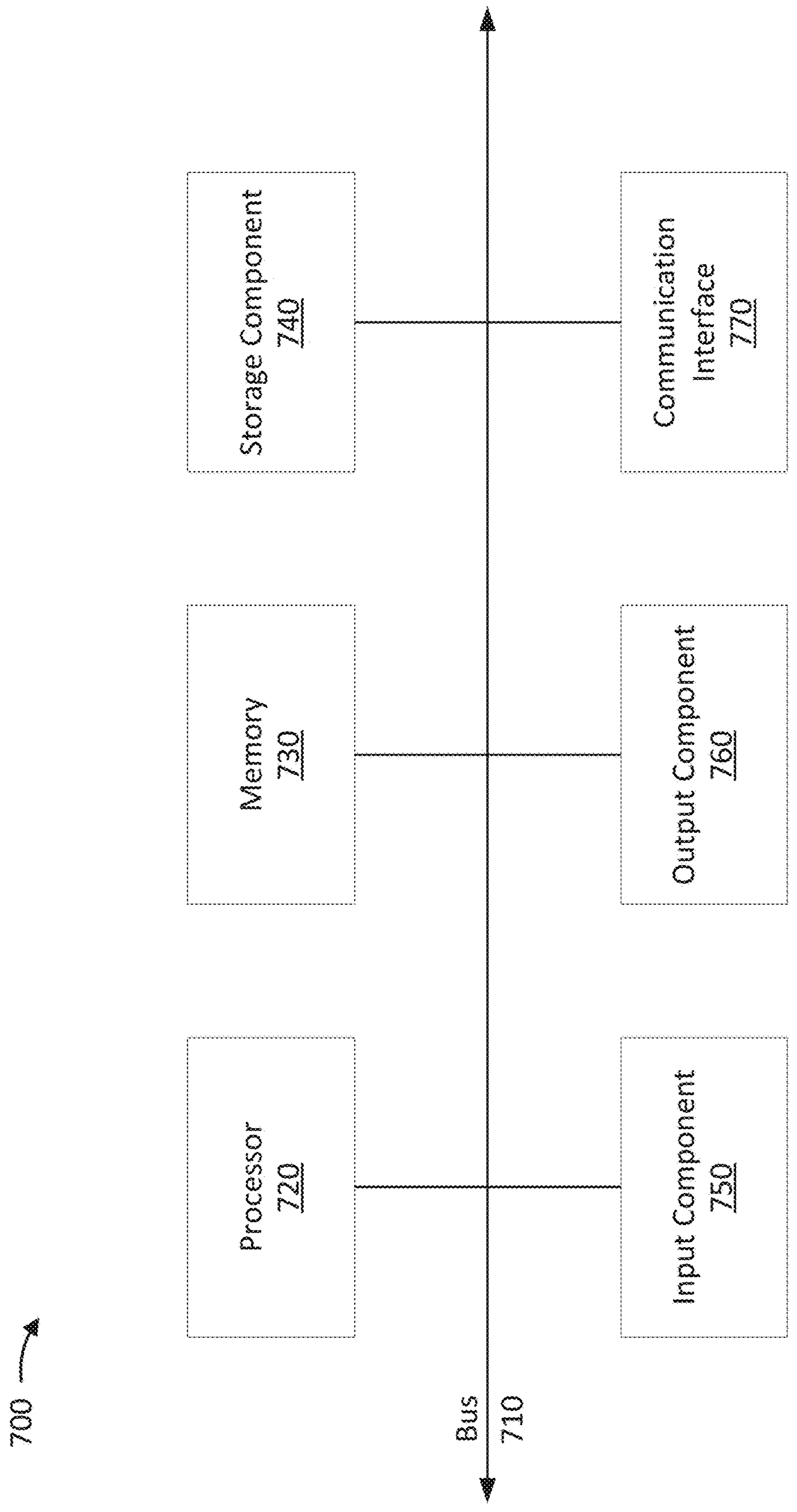

FIG. 7 is an illustration of example devices associated with optimized access in a service environment, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example system 100 associated with optimized access in a service environment, according to various aspects of the present disclosure. The system 100 shows a service environment including a user device 102 communicating with a network service provider infrastructure (NSP infrastructure) 110 over a network 120. In some aspects, the user device 102 and the NSP infrastructure 110 may communicate with one another for purposes of obtaining and/or providing network services. Such network services may include, for example, virtual private network (VPN) services, data storage and protection services, cyber security services, or a combination thereof. The user device 102 may include and/or be associated with a client application 104, a biometric unit 106, and a trusted platform module (TPM) device 108 communicatively coupled to an associated processor (e.g., processor 720) and/or memory (e.g., memory 730). In some aspects, the associated processor and/or memory may be local to the user device 102. In some aspects, the associated processor and/or memory may be remote with respect to the user device 102. The NSP infrastructure 110 may include a processing unit 112 and a database (e.g., memory) 114. The NSP infrastructure 110 may provide the client application 104 for installation to enable the user device 102 to communicate with an application programming interface (API) (not shown) included in the NSP infrastructure 110 and/or for obtaining the network services.

The user device 102 may be a physical computing device capable of hosting the client application 104 and of connecting to the network 120. The user device 102 may be, for example, a laptop, a mobile phone, a tablet computer, a desktop computer, a smart device, a router, or the like. In some aspects, the user device 102 may include, for example, Internet-of-Things (IoT) devices such as VSP smart home appliances, smart home security systems, autonomous vehicles, smart health monitors, smart factory equipment, wireless inventory trackers, biometric cyber security scanners, or the like. The user device 102 may include and/or may be associated with a communication interface to communicate (e.g., receive and/or transmit) data.

In some aspects, the NSP infrastructure 110 may provide the user device 102 with the client application 104 to be installed on the user device 102. As discussed below in further detail with respect to FIG. 2, the client application 104 may be configured to enable utilization of the biometric unit 106 and/or the TPM device 108 by (an operating system of) the user device 102 to optimize access of the user device 102 to the network services. Further, the client application 104 and/or the NSP infrastructure 110 may utilize one or more encryption and decryption algorithms to encrypt and decrypt data. The encryption algorithms and decryption algorithms may employ standards such as, for example, data encryption standards (DES), advanced encryption standards (AES), Rivest-Shamir-Adleman (RSA) encryption standard, Open PGP standards, file encryption overview, disk encryption overview, email encryption overview, etc. Some examples of encryption algorithms include a triple data encryption standard (DES) algorithm, Rivest-Shamir-Adleman (RSA) encryption algorithm, advanced encryption standards (AES) algorithms, Twofish encryption algorithms, Blowfish encryption algorithms, IDEA encryption algorithms, MD5 encryption algorithms, HMAC encryption algorithms, etc.

The biometric unit 106 may enable identification, authentication, and/or access control. In some aspects, the biometric unit 106 may include a biometric sensor for sensing and/or capturing biometric information associated with a user. Such biometric information may include, for example, fingerprint, palm print, finger shape, palm shape, voice, retina, iris, face image, sound, dynamic signature, blood vessel pattern, keystroke, or a combination thereof. The biometric unit 106 may utilize the associated processor to correlate the captured biometric information with user information, and to store a correlation of the biometric information with the user information in the associated memory. Further, the biometric unit 106 may enable comparison of a received biometric information with stored biometric information to verify and/or authenticate that the received biometric information is associated with the user information (e.g., belongs to the user).

The TPM device 108 may include a dedicated controller utilizing integrated cryptographic keys (e.g., signing keys, master keys) and/or cryptographic algorithms to operate as a secure crypto processor. The TPM device 108 may carry out cryptographic operations, embedded in a packaging with multiple physical security measures, which give it a degree of tamper resistance. In some aspects, the TPM device 108 may refrain from communicating the cryptographic keys (e.g., master keys, etc.) and/or the cryptographic algorithms externally (e.g., external to the TPM device 108).

The NSP infrastructure 110 may include the processing unit 112 and the database 114. The processing unit 112 may include a logical component configured to perform complex operations to evaluate various factors associated with optimizing access to the network services in the service environment. The database 114 may store various pieces of information associated with, for example, providing the network services, storing and protecting data, or a combination thereof. The database 114 may be configured to store encrypted content and/or encrypted key information. The NSP infrastructure 110 may include or be associated with a communication interface (e.g., communication interface 670) to communicate (e.g., transmit and/or receive) data.

The network 120 may be a wired or wireless network. In some aspects, the network 120 may include one or more of, for example, a phone line, a local-area network (LAN), a wide-area network (WAN), a metropolitan-area network (MAN), a home-area network (HAN), Internet, Intranet, Extranet, and Internetwork. In some aspects, the network 120 may include a digital telecommunication network that permits several nodes to share and access resources.

In some aspects, the data to be stored and/or protected may include any information such as private information including, for example, bank account numbers, credit card numbers, passwords, etc. In some aspects, the data may include electronic information included in files such as, for example, photographs, documents, compact discs (CDs), digital video disks (DVDs), etc. including written, printed, and/or electronic matter that provides information and/or evidence.

As indicated above, FIG. 1 is provided as an example. Other examples may differ from what is described with regard to FIG. 1.

A network service provider may provide network services to a user device. Such network services may include, for example, the VPN services, data storage and protection services, cyber security services, or a combination thereof. To receive the network services, the user device may register with an NSP infrastructure associated with the network service provider.

During registration, the user device may set up an access system including a first set of credentials (e.g., username, password, or a combination thereof) to subsequently gain access to the registered account. In an example, to gain access to the account, the user device may communicate the first set of credentials over a network to the NSP infrastructure. The NSP infrastructure may enable the user device to gain access to the account based at least in part on a successful authentication of the first set of credentials.

The NSP infrastructure may also enable the user device to gain access to a first network service (e.g., VPN service) based at least in part on the successful authentication of the first set of credentials. To gain access to a second network service (e.g., data storage and protection service), however, the NSP infrastructure may invite the user device to register a second set of credentials (e.g., a first unique secret string of alphanumeric and/or special characters) for authentication by the NSP infrastructure. The second set of credentials may at least partially be different with respect to the first set of credentials. Similarly, to gain access to a third network service (e.g., cyber security service), the NSP infrastructure may invite the user device to register a third set of credentials (e.g., a second unique secret string of alphanumeric characters) for authentication by the NSP infrastructure. The third set of credentials may at least partially be different with respect to the first set of credentials and/or the second set of credentials.

In this case, the user device may maintain (e.g., store, manage, etc.) multiple sets of credentials to gain access to multiple network services. Maintaining credentials, and, moreover, maintaining multiple sets of credentials may be inconvenient, onerous, and/or unsecure. In an example, credentials may be compromised due to various reasons such as, for example, an inadequate strength of the credentials, inadvertent leaks and/or misplacement of the credentials, hacking of a central server storing the credentials, hacking of devices utilizing the credentials, communication of the credentials while connected to unsecure networks (e.g., unsecure Wi-Fi), dealing with unsecure websites, downloading or utilizing unsecure applications, or a combination thereof. In another example, utilizing a credential manager to manage the credentials may fail to address a situation in which the credentials are compromised during communication of the credentials (e.g., during authentication). For instance, a malicious party may gain unauthorized access to communications (e.g., data being communicated) between the user device and the NSP infrastructure, thereby gaining unauthorized access to the communicated credentials. As a result, an integrity associated with the credentials and/or private information associated with the credentials may be compromised. To address effects of the unauthorized access to the credentials, the user device and/or the NSP infrastructure may expend resources (e.g., management resources, memory resources, computational/processing resources, power consumption resources, system bandwidth, network resources, etc.) that may otherwise be used for more suitable tasks associated with the network services.

Various aspects of systems and techniques discussed in the present disclosure provide optimized access in a service environment. An NSP infrastructure (e.g., NSP infrastructure 110 shown in FIG. 1) may provide network services to a user device. In some aspects, the NSP infrastructure may provide the user device with a client application, which is configured to enable utilization of a biometric unit and/or a TPM device by (an operating system of) the user device for enabling the optimized access. In some aspects, the optimized access may include providing access to one or more network services without the user device communicating credentials (e.g., username, passwords, secret strings, one-time password/tokens, or a combination thereof) for authentication. In this way, the NSP infrastructure and/or the client application may minimize instances of private information associated with the user device becoming compromised. Further, the NSP infrastructure and/or the client application may avoid inconvenient, onerous, and/or unsecure maintenance of multiple sets of credentials. As a result, the NSP infrastructure and/or the user device may enable efficient utilization of resources (e.g., management resources, memory resources, computational/processing resources, power consumption resources, system bandwidth, network resources, etc.) for more suitable tasks associated with the network services.

The client application may also enable the user device to encrypt and decrypt data. In an example, the client application may enable the user device to encrypt data, to store the encrypted data, and to decrypt the encrypted data. In some aspects, the user device may encrypt the data, store the encrypted data, and decrypt the encrypted data without the NSP infrastructure having access to and/or storing unencrypted data. As a result, even if a malicious party gains unauthorized access to the NSP infrastructure, the unauthorized access may lead to encrypted data, which the third party may not be able to decrypt. The client application and/or the NSP infrastructure may enable utilization of the biometric unit, the TPM device, and/or a particular arrangement of keys to encrypt and decrypt the data. Such utilization of the biometric unit, the TPM device, and/or the particular arrangement of keys may be critical because it enables the client application and/or the NSP infrastructure to provide network services (e.g., data storage and protection services) without the NSP infrastructure storing unencrypted data (e.g., without the NSP infrastructure having access to unencrypted data and/or unencrypted keys). In this way, the client application and/or the NSP infrastructure may mitigate instances of the stored data becoming compromised, and enable efficient utilization of resources (e.g., management resources, memory resources, computational/processing resources, power consumption resources, system bandwidth, network resources, etc.) associated with the user device and/or the NSP infrastructure for more suitable tasks related to the network services.

In some aspects, a processor executing the client application may transmit a request to determine a signature key; receive a unique identifier associated with the signature key; authenticate received biometric information; selectively transmit, based at least in part on a result of authenticating the biometric information, a signature request that includes the unique identifier in association with validation data to indicate that the signature key, associated with the unique identifier, is to be utilized to sign the validation data; and receive signed validation data that is signed based at least in part on utilizing the signature key.

FIG. 2 is an illustration of an example flow 200 associated with optimized access in a service environment, according to various aspects of the present disclosure. The example flow 200 may include a user device 102 in communication with an NSP infrastructure 110 for purposes of obtaining network services. As discussed above with respect to FIG. 1, the user device 102 may include a client application 104, a biometric unit 106, and a TPM device 108. In some aspects, the NSP infrastructure 110 may provide the client application 104 to enable the user device 102 to communicate with an application programming interface (API) and/or a processor (e.g., processing unit 112, processor 720) associated with the NSP infrastructure 110. In some aspects, the user device 102 and the NSP infrastructure may communicate over a network (e.g., network 120).

In some aspects, the NSP infrastructure 110 may provide the client application 104 to be installed on the user device 102. The client application 104 may enable the user device 102 to receive information to be processed by the client application 104 and/or by the NSP infrastructure 110. The client application 104 may include a graphical interface to receive the information via a local input interface (e.g., touch screen, keyboard, mouse, pointer, etc.) associated with the user device 102. The information may be received via text input or via a selection from among a plurality of options (e.g., pull down menu, etc.). In some aspects, the client application 104 may activate and/or enable, at a time associated with the registration (e.g., after the registration), the graphical interface for receiving the information. For instance, the client application 104 may cause a screen (e.g., local screen) associated with the user device 102 to display, for example, a pop-up message to request entry of the information. The client application 104 may also enable transmission of at least a portion of the information to the NSP infrastructure 110.

As shown by reference numeral 210, the user device 102 may register an account with the NSP infrastructure 110. In some aspects, during registration, the user device 102 may provide registration information such as, for example, identity of an owner of the user device 102, a phone number associated with the user device 102, an email address associated with the user device 102, or a combination thereof. In some aspects, the user device 102 may set up an access system including credentials (e.g., username, password, or a combination thereof) to subsequently gain access to (e.g., login into) the registered account to communicate with the NSP infrastructure 110.

Further, the client application 104 may determine availability of the biometric unit 106 and of the TPM device 108. To determine availability of the biometric unit 106 and of the TPM device 108, the client application 104 may request and receive, from an operating system of the user device, information indicating that the biometric unit 106 and of the TPM device 108 are associated with the operating system.

Based at least in part on determining availability of the biometric unit 106 and of the TPM device 108, the client application 104 may enable utilization of the biometric unit 106 and/or the TPM device 108 for optimizing access to the network services. In an example, as shown by reference numeral 220, the client application 104 may utilize the operating system to associate verification and/or authentication of biometric information with operation of the TPM device 108. For instance, the client application 104 may associate verification and/or authentication of biometric information with, for example, signing of data by the TPM device 108, with encrypting of data by the TPM device 108, and/or with decrypting of data by the TPM device 108. The associating of verification and/or authentication of biometric information with operation of the TPM device 108 may be such that a request for the TPM device 108 to, for example, sign data, encrypt data, and/or decrypt data is to indicate or be accompanied by a result of successful verification and/or authentication of biometric information.

To associate verification and/or authentication of biometric information with operation of the TPM device 108, the client application 104 may, for example, display a pop-up message on a screen associated with the user device 102 to request biometric information from an authorized user of the user device 102. Further, the client application 104 may enable (e.g., cause) the operating system to activate the biometric unit 106 to sense the biometric information. The client application 104 may receive and store, in an associated memory, the biometric information that belongs to the authorized user as authentic biometric information.

When the client application 104 is to transmit a request for the TPM device 108 to, for example, sign data, encrypt data, and/or decrypt data, the client application 104 may verify and/or authenticate biometric information in real time. In an example, to verify and/or authenticate the biometric information, the client application 104 may enable (e.g., cause) the operating system to activate the biometric unit 106 to receive biometric information in real time (e.g., at a time associated with transmitting the request). Further, the client application 104 may compare the received biometric information with the authentic biometric information stored in the associated memory. When the received biometric information matches (e.g., is the same as) the stored authentic biometric information, the client application 104 may determine that the received biometric information belongs to the authorized user and may select to transmit the request for the TPM device to, for example, sign data, encrypt data, and/or decrypt data. In some aspects, the request may indicate or include a result of the received biometric information matching the authentic biometric information (e.g., successful authentication) to the TPM device 108. Alternatively, when the received biometric information fails to match (e.g., is different from) the stored authentic biometric information, the client application 104 may determine that the received biometric information does not belong to the authorized user and may select to refrain from transmitting the request for the TPM device to, for example, sign data, encrypt data, and/or decrypt data.

Further, based at least in part on associating verification and/or authentication of biometric information with operation of the TPM device 108, as shown by reference numeral 230, the client application 104 may request the TPM device 108 to determine a signature key. In some aspects, as discussed below in further detail, the signature key may be associated with authenticating the client application 104 and/or the user device 102 with the NSP infrastructure 110. In some aspects, the signature key may include an asymmetric signature key pair including a signature public key and a signature private key. The signature public key and the signature private key may be associated with each other via, for example, a mathematical function. As a result, data signed using the signature private key may be validated by utilizing the signature public key. Also, data encrypted using the signature public key may be decrypted by utilizing the signature private key.

In some aspects, only the TPM device 108 may have access to the signature key (e.g., the TPM device 108 may keep the signature key confidential). Based at least in part on determining the signature key, as shown by reference numeral 240, the TPM device 108 may return a unique signature key identifier associated with (e.g., that identifies) the signature key to the client application 104. In some aspects, the signature key and/or the signature key identifier may be specific to (e.g., may be utilized by) the client application 104 and/or to the user device 102.

As shown by reference numeral 250, the client application 104 may provide authentication information to the NSP infrastructure 110. The authentication information may include, for example, the signature public key, an installation identifier associated with the client application 104, and account information associated with the registered account. The client application 104 may determine the installation identifier based at least in part on information associated with the user device 102 installing a present (e.g., existing) instance of the client application 104. In some aspects, the NSP infrastructure 110 may provide the installation identifier to the user device 102 in association with the user device 102 installing the client application 104. In some aspects, the NSP infrastructure 110 may store the installation identifier in the client application 104. The account information may include information (e.g., account name, account number, or combination thereof) that identifies the registered account and/or enables the NSP infrastructure 110 to identify the registered account. In some aspects, the NSP infrastructure 110 may provide such account information to the user device 102 at a time associated with the user device 102 registering the account with the NSP infrastructure 110.

Based at least in part on receiving the authentication information, as shown by reference numeral 260, the NSP infrastructure 110 and the client application 104 may conduct a challenge-response procedure. The NSP infrastructure 110 may determine validation data to be utilized during the challenge-response procedure. In some aspects, the NSP infrastructure 110 may determine validation data based at least in part on whether the user device 102 is logged into the registered account. In an example, based at least in part on determining that the user device 102 is logged into the registered account, the NSP infrastructure 110 may determine first validation data (e.g., alphanumeric string) and based at least in part on determining that the user device 102 is not logged into the registered account, the NSP infrastructure 110 may determine second validation data (e.g., one-time credential).

In the case where the user device is logged into the registered account, the NSP infrastructure 110 may generate validation data, which may include, for example, an alphanumeric string of random and unbiased characters. The NSP infrastructure 110 may challenge the user device 102 to sign the alphanumeric string by transmitting the alphanumeric string to the client application 104. The client application 104 may transmit a signature request to the TPM device 108 to sign the alphanumeric string. The request may include the signature key identifier in association with the alphanumeric string received from the NSP infrastructure 110. Based at least in part on the request including the signature key identifier in association with the alphanumeric string, the client application 104 may indicate to the TPM device 108 that the signature key, associated with the signature key identifier, is to be utilized to sign the alphanumeric string. In other words, based at least in part on transmitting the signature key identifier in association with the alphanumeric string, the client application 104 may enable the TPM device 108 to utilize the signature key, identified by the unique identifier, to sign the alphanumeric string.

Additionally, the signature request may indicate and/or include a result of the client application 104 verifying and/or authenticating biometric information. In an example, the client application 104 may receive and verify/authenticate biometric information in real time (e.g., while transmitting the signature request), as discussed elsewhere herein. When the received biometric information matches the stored authentic biometric information, the client application 104 may determine that the received biometric information belongs to the authorized user and may select to transmit the signature request. Further, the client application 104 may indicate and/or include the result of the successful verification and/or authentication in the signature request.

Based at least in part on receiving the signature request, the TPM device 108 may sign the alphanumeric string. In an example, the TPM device 108 may determine, from the indicated result of the verification and/or authentication, that the received biometric information matches the stored authentic biometric information. Further, the TPM device 108 may determine that the alphanumeric string is to be signed using the signature key based at least in part on the alphanumeric string being received in association with the signature key identifier, as indicated by the signature request. As a result, the TPM device 108 may utilize the signature private key to sign the alphanumeric string. In some aspects, the TPM device 108 may utilize a hash function (e.g., SHA1, MD5, etc.) to hash characters included in the alphanumeric string and may encrypt the hashed characters with the signature private key. The TPM device 108 may provide the signed alphanumeric string to the client application 104.

In turn, the client application 104 may respond to the challenge by transmitting the signed alphanumeric string to the NSP infrastructure 110, which may utilize the signature public key to validate the signed alphanumeric string. In an example, the NSP infrastructure 110 may utilize the association between the signature public key and the signature private key to validate the signed alphanumeric string. For instance, the NSP infrastructure 110 may calculate a hash of the characters included in the alphanumeric string. Further, the NSP infrastructure 110 may attempt to decrypt the signed alphanumeric string with the signature public key to receive the hashed characters included in the signed alphanumeric string. When the decryption is successful, the NSP infrastructure 110 may determine that the user device 102 is in possession of the signature private key. The NSP infrastructure 110 may compare the calculated hash with the hashed characters included in the alphanumeric string. When the result of the comparison indicates that the calculated hash matches (e.g., is the same as) the hashed characters included in the alphanumeric string, the NSP infrastructure 110 may determine that the user device 102, to which the NSP infrastructure 110 had transmitted the alphanumeric string, has signed the alphanumeric string by utilizing the signature private key. In other words, the NSP infrastructure 110 may determine that the user device 102 has adequately responded to the challenge.

In this case, the NSP infrastructure 110 may store the installation ID associated with the client application 104 and/or the signature public and/or the account information in association with the registered account.

In the case where the user device is not logged into the registered account, the NSP infrastructure 110 may generate second validation data, which may include, for example, a one-time credential. In this case, the NSP infrastructure 110 and the client application 104 may conduct the challenge-response procedure utilizing the second validation data.

Further, based at least in part on receiving the authentication information (e.g., block 250) from the client application 104, the NSP infrastructure 110 may utilize the authentication information to identify the client application 104 and/or the registered account. Further, the NSP infrastructure 110 may utilize the identified client application 104 and/or the registered account to determine associated registration information.

The NSP infrastructure may utilize the registration information to transmit the one-time credential (e.g., one-time pin, one-time token, etc.) to the user device 102. In an example, the NSP infrastructure 110 may email the one-time credential utilizing the email address associated with the user device 102. In another example, the NSP infrastructure 110 may message the one-time credential utilizing the phone number associated with the user device 102. Further, the NSP infrastructure may indicate that the one-time credential is to be signed using the signature key.

The operating system of the user device 102 may enable the client application 104 to receive the one-time credential. In an example, the operating system may provide contents included in a communication (e.g., email, message, etc.) received from the NSP infrastructure 110 to the client application 104. For instance, based at least in part on the communication being received from the NSP infrastructure 110, the operating system may provide the one-time credential included in the communication to the client application 104. In another example, the operating system may enable the client application 104 to determine receipt of the one-time credential from the NSP infrastructure 110. For instance, the operating system may enable the client application 104 to detect receipt of the communication of the NSP infrastructure 110, and to gain access to contents (e.g., one-time credential) included in the communication. In yet another example, based at least in part on transmitting the first service request, the client application 104 may display a pop-up message on a screen associated with the user device 102 to request entry of the one-time credential via an input interface.

Based at least in part on receiving the one-time credential, the client application 104 may transmit a signature request to the TPM device 108 to sign the one-time credential with the signature key. The request may include the signature key identifier in association with the one-time credential received from the NSP infrastructure 110. Based at least in part on the request including the signature key identifier in association with the one-time credential, the client application 104 may indicate to the TPM device 108 that the signature key, associated with the signature key identifier, is to be utilized to sign the one-time credential. In other words, based at least in part on transmitting the signature key identifier in association with the one-time credential, the client application 104 may enable the TPM device 108 to utilize the signature key, identified by the unique identifier, to sign the one-time credential.

Additionally, the signature request may include a result of the client application 104 verifying and/or authenticating biometric information. In an example, the client application 104 may receive and verify/authenticate biometric information in real time (e.g., while transmitting the signature request), as discussed elsewhere herein. When the received biometric information matches the stored authentic biometric information, the client application 104 may determine that the received biometric information belongs to the authorized user and may select to transmit the signature request. Further, the client application 104 may indicate the result of the successful verification and/or authentication in the signature request.

Based at least in part on receiving the signature request, the TPM device 108 may sign the one-time credential. In an example, the TPM device 108 may determine, from the indicated result of the verification and/or authentication, that the received biometric information matches the stored authentic biometric information. Further, the TPM device 108 may determine that the one-time credential is to be signed using the signature key associated with the signature key identifier, as indicated by the signature request. As a result, the TPM device 108 may utilize the signature private key to sign the one-time credential. In some aspects, the TPM device 108 may utilize a hash function (e.g., SHA1, MD5, etc.) to hash characters included in the one-time credential and may encrypt the hashed characters with the signature private key. The TPM device 108 may provide the signed one-time credential to the client application 104.

In turn, the client application 104 may respond to the challenge by transmitting the signed one-time credential to the NSP infrastructure 110, which may utilize the signature public key to validate the signed one-time credential. In an example, the NSP infrastructure 110 may utilize the association between the signature public key and the signature private key to validate the signed one-time credential. For instance, the NSP infrastructure 110 may calculate a hash of the characters included in the one-time credential. Further, the NSP infrastructure 110 may attempt to decrypt the signed one-time credential with the signature public key to receive the hashed characters included in the signed one-time credential. When the decryption is successful, the NSP infrastructure 110 may determine that the user device 102 is in possession of the signature private key. The NSP infrastructure 110 may compare the calculated hash with the hashed characters included in the one-time credential. When the result of the comparison indicates that the calculated hash matches (e.g., is the same as) the hashed characters included in the one-time credential, the NSP infrastructure 110 may determine that the user device 102, to which the NSP infrastructure 110 had transmitted the one-time credential, has signed the one-time credential. In other words, the NSP infrastructure 110 may determine that the user device 102 has adequately responded to the challenge.

In this case, the NSP infrastructure 110 may store the installation ID associated with the client application 104 and/or the signature public and/or the account information in association with the registered account.

As shown by reference numeral 270, the user device 102 may obtain one or more network services via optimized access. When the user device 102 is logged into the registered account, the client application 104 may transmit a first service request to obtain a first network service. Based at least in part on receiving the first service request, the NSP infrastructure 110 and the user device 102 may conduct a first challenge-response procedure utilizing the validation data (e.g., alphanumeric string), as discussed elsewhere herein. Based at least in part on the user device 102 adequately responding to the first challenge, the NSP infrastructure 110 may enable the user device 102 to obtain the first network service. In this way, the user device 102 may obtain the first network service without communicating credentials (e.g., passwords, secret strings, etc.).

Additionally, while remaining logged in and/or while obtaining the first network service, the client application 104 may transmit a second service request indicating a second network service (e.g., data storage and protection service) to be obtained by the user device 102. Based at least in part on receiving the second service request, the NSP infrastructure 110 and the user device 102 may conduct a second challenge-response procedure utilizing the validation data (e.g., alphanumeric string), as discussed elsewhere herein. Based at least in part on the user device 102 adequately responding to the second challenge, the NSP infrastructure 110 may enable the user device 102 to obtain the second network service. In this way, the user device 102 may obtain the second network service without communicating credentials (e.g., passwords, secret strings, etc.), and so on.

In some aspects, the user device 102 may obtain the one or more network services without gaining access to (e.g., logging into) the registered account. In this case, without logging into the registered account, the user device 102 may utilize the client application 104 to transmit a first service request to request a first service. In this case, prior to transmitting the first service request, the client application 104 may request entry of information indicating association of the user device 102 with an account. Alternatively, the client application may utilize information associated with a last known logged-in user and/or account to transmit the first request.

While remaining not logged into the registered account, based at least in part on receiving the first service request, the NSP infrastructure 110 and the user device 102 may conduct a first challenge-response procedure utilizing the validation data (e.g., the one-time credential), as discussed elsewhere herein. Based at least in part on the user device 102 adequately responding to the first challenge, the NSP infrastructure 110 may enable the user device 102 to obtain the first network service. In this way, the user device 102 may obtain the first network service without communicating credentials (e.g., passwords, secret strings, etc.).

Additionally, while obtaining the first network service, the client application 104 may transmit a second service request indicating a second network service (e.g., data storage and protection service) to be obtained by the user device 102. Based at least in part on receiving the second service request, the NSP infrastructure 110 and the user device 102 may conduct a second challenge-response procedure utilizing the validation data (e.g., one-time credential), as discussed elsewhere herein. Based at least in part on the user device 102 adequately responding to the second challenge, the NSP infrastructure 110 may enable the user device 102 to obtain the second network service. In this way, the user device 102 may obtain the second network service without communicating credentials (e.g., passwords, secret strings, etc.), and so on.

In this way, the optimized access may include obtaining one or more network services without the user device entering credentials (e.g., username, passwords, secret strings, one-time password/tokens, or a combination thereof) for authentication. As a result, the NSP infrastructure and/or the client application may minimize instances of private information associated with the user device becoming compromised. Additionally, the NSP infrastructure and/or the user device may enable efficient utilization of resources (e.g., management resources, memory resources, computational/processing resources, power consumption resources, system bandwidth, network resources, etc.) for more suitable tasks associated with the network services.

As indicated above, FIG. 2 is provided as an example. Other examples may differ from what is described with regard to FIG. 2.

FIG. 3 is an illustration of an example flow 300 associated with optimized access in a service environment, according to various aspects of the present disclosure. The example flow 300 may include a user device 102 in communication with a NSP infrastructure 110 for purposes of obtaining data storage and protection services. As discussed above with respect to FIGS. 1 and 2, the user device 102 may include a client application 104, a biometric unit 106, and a TPM device 108. In some aspects, the NSP infrastructure 110 may provide the client application 104 to enable the user device 102 to communicate with an application programming interface (API) and/or a processor (e.g., processing unit 112, processor 720) associated with the NSP infrastructure 110. In some aspects, the user device 102 and the NSP infrastructure may communicate over a network (e.g., network 120).

As discussed with respect to FIG. 2, the NSP infrastructure 110 may provide the client application 104 to be installed on the user device 102. Also, as discussed with respect to FIG. 2, the user device 102 may register an account with the NSP infrastructure 110 (e.g., block 210). Further, as discussed with respect to FIG. 2, based at least in part on determining availability of the biometric unit 106 and of the TPM device 108, the client application 104 may enable utilization of the biometric unit 106 and/or the TPM device 108 for optimizing access to the data storage and protection services. In an example, as discussed with respect to FIG. 2, the client application 104 may utilize an operating system utilized by the user device 102 to associate verification and/or authentication of biometric information with operation of the TPM device 108 (e.g., block 220).

As shown by reference numeral 310, the client application 104 may request the TPM device 108 to determine a master key. In some aspects, the master key may be associated with encryption and decryption of keys (e.g., assigned private key) utilized to store and protect data. In some aspects, the master key may include a symmetric master key. In some aspects, the master key may include an asymmetric master key pair including a master public key and a master private key. In some aspects, only the TPM device 108 may have access to the master key (e.g., the TPM device 108 may keep the master key confidential). Based at least in part on determining the master key, as shown by reference numeral 320, the TPM device 108 may return a unique identifier associated with (e.g., that identifies) the master key to the client application 104. In some aspects, the master key and/or the unique identifier may be specific to (e.g., may be utilized by) the user device 102.

As shown by reference numeral 330, the client application 104 may also determine information based at least in part on the registration of the account with the NSP infrastructure 110. In an example, the client application 104 may determine an asymmetric assigned key pair. In some aspects, the assigned key pair may be unique to the registered account and may include an assigned public key and an assigned private key. In this way, the assigned public key and the assigned private key may be account-specific. The assigned public key and the assigned private key may be associated with each other via, for example, a mathematical function. As a result, data encrypted using the assigned public key may be decrypted by utilizing the assigned private key. In some aspects, the determined assigned key pair may be unique to and/or may it be associated with the registered account.

As shown by reference numeral 340, the client application 104 may transmit an encryption request for the TPM device 108 to encrypt the assigned private key. In some aspects, the request may include the unique identifier associated with the master key and the assigned private key. Based at least in part on the request including the unique identifier in association with the assigned private key, the client application 104 may indicate to the TPM device 108 that the master key, associated with the unique identifier, is to be utilized to encrypt the assigned private key. In other words, based at least in part on transmitting the unique identifier in association with the assigned private key, the client application 104 may enable the TPM device 108 to utilize the master key, identified by the unique identifier, to encrypt the assigned private key.

Additionally, the request may include a result of the client application 104 verifying and authenticating biometric information. In an example, the client application 104 may receive and verify/authenticate biometric information in real time (e.g., while transmitting the encryption request), as discussed elsewhere herein. When the received biometric information matches the stored authentic biometric information, the client application 104 may determine that the received biometric information belongs to the authorized user and may select to transmit the encryption request. Further, the client application 104 may include the result of the successful verification and/or authentication in the encryption request.

Based at least in part on receiving the encryption request, the TPM device 108 may encrypt the assigned private key. In an example, the TPM device 108 may determine, from the included result of the verification and/or authentication, that the received biometric information matches the stored authentic biometric information. Further, the TPM device 108 may determine that the assigned private key is to be encrypted using the master key associated with the unique identifier, as indicated by the encryption request. When the master key includes the symmetric master key, the TPM device 108 may utilize the symmetric master key to encrypt the assigned private key. When the master key includes the master public key and the master private key, the TPM device 108 may utilize the master public key to encrypt the assigned private key. In some aspects, the TPM device 108 may provide the encrypted assigned private key to the client application 104.

As shown by reference numeral 350, when the user device 102 is to encrypt data that is to be stored and/or protected, the client application 104 may determine a symmetric content key and an access key pair. In some aspects, the client application 104 may determine respective symmetric content keys and respective access key pairs for each piece of data (e.g., content) that the user device 102 is to encrypt. In this way, the symmetric content key and the access key pair may be content-specific. Examples of content may include any information including, for example, alphanumeric data such as passwords, credit card numbers, bank account numbers, etc. and/or information that is written, printed, and/or electronically included in documents and/or files such as photographs, or processing documents, CDs, DVDs, etc. In some aspects, a symmetric content key and/or an access key pair may be associated with a volume of memory such that content stored in the volume of memory may be encrypted utilizing the symmetric content key and/or the access key pair.

For given content, the client application 104 may utilize a random bit generator to determine the symmetric content key. In this case, the symmetric content key may be a random key including a sequence of unpredictable and unbiased information. Further, for the given content, the client application 104 may determine an access key pair including an access public key and an access private key. The access public key and the access private key may be associated with each other via, for example, a mathematical function. As a result, data encrypted using the access public key may be decrypted by utilizing the access private key.

The client application 104 may utilize the assigned public key, the symmetric content key, and the access key pair to encrypt the content. In an example, the client application 104 may encrypt the access private key using the assigned public key associated with the registered account and/or user device 102. The client application 104 may encrypt the symmetric content key using the access public key. The client application 104 may encrypt the content using the symmetric content key.

In some aspects, the client application 104 may enable the user device 102 to store the encrypted content. For instance, the user device 102 may store the encrypted content locally and/or remotely. In an example, the user device 102 may store the encrypted content in a local memory and/or a remote memory associated with the user device 102. In another example, the user device 102 may store the encrypted content in a data storage associated with network services provided by the NSP infrastructure. In yet another example, the user device 102 may store the encrypted content in a hand-held memory (e.g., a USB thumb drive, flash drive, etc.).

As shown by reference numeral 360, the client application 104 may transmit, and the NSP infrastructure 110 may receive, at least a portion of the information determined by the client application 104. For instance, the client application 104 may transmit the encrypted content and related keys, which may include one or more of the assigned public key, the access public key, the encrypted access private key, and/or the encrypted symmetric content key. The NSP infrastructure 110 may store the encrypted content and the related keys in association with the registered account and/or the user device 102.

As shown by reference numeral 370, the client application 104 may decrypt the encrypted content. In an example, when the user device 102 is to decrypt the encrypted content, the user device 102 may access (e.g., login into) the registered account and request the encrypted content and the related keys from the NSP infrastructure 110. Based at least in part on receiving the request, the NSP infrastructure 110 may transmit, and the client application 104 may receive, the encrypted content and the related keys.

Further, the client application 104 may transmit a decryption request for the TPM device 108 to decrypt the encrypted assigned private key. As discussed previously (e.g., block 320), a request to decrypt the encrypted assigned private key is to be accompanied by a result of verifying and authenticating biometric information in real time. As a result, the client application 104 may enable (e.g., cause) the operating system to activate the biometric unit 106 to receive biometric information in real time (e.g., why transmitting the request to decrypt). Based at least in part on receiving the biometric information, the client application 104 may compare the received biometric information with the stored authentic biometric information.

When a result of the comparison indicates that the received biometric information matches (e.g., is the same as) the stored authentic biometric information, the client application 104 may determine that the received biometric information belongs to the authorized user. In this case, the client application 104 may select to transmit the decryption request, which may include the result of the successful verification and/or authentication, the encrypted assigned private key, and/or the unique identifier associated with the master key. The decryption request may include the unique identifier in association with the encrypted assigned private key to indicate to the TPM device 108 that the encrypted assigned private key is to be decrypted based at least in part on utilizing the master key that is associated with (e.g., identified by) the unique identifier. Based at least in part on the result of the accessible verification/authentication and/or the unique identifier being included in the decryption request, the TPM device 108 may utilize the master key (e.g., the symmetric master key or the private master key) associated with the unique identifier to decrypt the encrypted assigned private key. The TPM device 108 may return the decrypted assigned private key to the client application 104.

The client application 104 may utilize the decrypted assigned private key to decrypt the encrypted access private key based at least in part on an association between the assigned private key and the assigned public key. Further, the client application 104 may utilize the access private key to decrypt the symmetric content key based at least in part on an association between the access private key and the access public key. The client application 104 may utilize the symmetric content key to decrypt the content.

Alternatively, when the result of the comparison indicates that the received biometric information fails to match (e.g., is different from) the stored authentic biometric information, the client application 104 may determine that the received biometric information does not belong to the authorized user. In this case, the client application 104 may select to refrain from transmitting the decryption request. In an example, the client application 104 may decline to decrypt the content and/or may refrain from providing the result of the comparison and/or the unique identifier to the TPM device 108.

As discussed above, the client application and/or the NSP infrastructure may enable utilization of the biometric unit, the TPM device, and/or a particular arrangement of keys to store and protect data. Such utilization of the biometric unit, the TPM device, and/or the particular arrangement of keys is critical because it enables the client application and/or the NSP infrastructure to provide network services (e.g., to protect stored data) without the NSP infrastructure storing unencrypted data (e.g., without the NSP infrastructure having access to unencrypted data and/or unencrypted private keys). In this way, the client application and/or the NSP infrastructure may mitigate instances of the data becoming compromised, and enable efficient utilization of resources (e.g., management resources, memory resources, computational/processing resources, power consumption resources, system bandwidth, network resources, etc.) associated with the user device and/or the NSP infrastructure for more suitable tasks related to the network services.

As indicated above, FIG. 3 is provided as an example. Other examples may differ from what is described with regard to FIG. 3.

FIG. 4 is an illustration of an example process 400 associated with optimized access in a service environment, according to various aspects of the present disclosure. In some aspects, the process 400 may be performed by a memory and/or a processor/controller (e.g., processor 720) associated with a user device (e.g., user device 102) executing a client application. As shown by reference numeral 410, process 400 may include transmitting, by a processor associated with a user device, a request to determine a signature key. For instance, the user device may utilize an associated communication interface (e.g., communication interface 770) with the associated processor/controller to transmit a request to determine a signature key, as discussed elsewhere herein.

As shown by reference numeral 420, process 400 may include receiving, by the processor, a unique identifier associated with the signature key. For instance, the user device may utilize the associated communication interface and processor/controller to receive a unique identifier associated with the signature key, as discussed elsewhere herein.

As shown by reference numeral 430, process 400 may include authenticating, by the processor, received biometric information. For instance, the user device may utilize the associated processor/controller to authenticate received biometric information, as discussed elsewhere herein.

As shown by reference numeral 440, process 400 may include selectively transmitting, by the processor based at least in part on a result of authenticating the biometric information, a signature request that includes the unique identifier in association with validation data to indicate that the signature key, associated with the unique identifier, is to be utilized to sign the validation data. For instance, the user device may utilize the associated communication interface and processor/controller to selectively transmit, based at least in part on a result of authenticating the biometric information, a signature request that includes the unique identifier in association with validation data to indicate that the signature key, associated with the unique identifier, is to be utilized to sign the validation data, as discussed elsewhere herein.

As shown by reference numeral 450, process 400 may include receiving, by the processor, signed validation data that is signed based at least in part on utilizing the signature key. For instance, the user device may utilize the associated communication interface and processor/controller to receive signed validation data that is signed based at least in part on utilizing the signature key, as discussed elsewhere herein.

Process 400 may include additional aspects, such as any single aspect or any combination of aspects described below and/or in connection with one or more other processes described elsewhere herein.

In a first aspect, in process 400, authenticating the received biometric information includes authenticating the received biometric information at a time associated with selectively transmitting the signature request.

In a second aspect, alone or in combination with the first aspect, in process 400, authenticating the received biometric information includes comparing the received biometric information with stored authentic biometric information.

In a third aspect, alone or in combination with the first through second aspects, in process 400, selectively transmitting the signature request includes selecting to transmit the signature request when the result of authenticating the received biometric information indicates that the received biometric information matches stored authentic biometric information.

In a fourth aspect, alone or in combination with the first through third aspects, in process 400, the validation is to be signed based at least in part on utilizing a signature private key included in the signature key.

In a fifth aspect, alone or in combination with the first through fourth aspects, in process 400, the validation data includes an alphanumeric string when the user device is logged into an account for obtaining a network service or includes a one-time credential when the user device is not logged into an account for obtaining the network service.

In a sixth aspect, alone or in combination with the first through fifth aspects, process 400 may include transmitting the signed validation data for authentication by an infrastructure device that is to provide a network service to the user device.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with optimized access in a service environment, according to various aspects of the present disclosure. In some aspects, the process 500 may be performed by a memory and/or a processor/controller (e.g., processor 720) associated with a user device (e.g., user device 102) executing a client application. As shown by reference numeral 510, process 500 may include receiving, by a user device, first validation data based at least in part on transmitting a first service request to receive a first network service. For instance, the user device may utilize an associated communication interface (e.g., communication interface 770) with the associated memory and processor to receive first validation data based at least in part on transmitting a first service request to receive a first network service, as discussed elsewhere herein.

As shown by reference numeral 520, process 500 may include receiving, by the user device, the first network service by providing signed first validation data based at least in part on authenticating first biometric information. For instance, the user device may utilize the associated communication interface, memory, and processor to receive the first network service by providing signed first validation data based at least in part on authenticating first biometric information, as discussed elsewhere herein.

As shown by reference numeral 530, process 500 may include transmitting, by the user device while receiving the first service, a second service request to receive a second network service. For instance, the user device may utilize the associated communication interface, memory, and processor to transmit, while receiving the first service, a second service request to receive a second network service, as discussed elsewhere herein.

As shown by reference numeral 540, process 500 may include receiving, by the user device, second validation data based at least in part on transmitting the second service request. For instance, the user device may utilize the associated communication interface, memory, and processor to receive second validation data based at least in part on transmitting the second service request, as discussed elsewhere herein.

As shown by reference numeral 550, process 500 may include receiving, by the user device, the second network service by providing signed second validation data based at least in part on authenticating second biometric information. For instance, the user device may utilize the associated communication interface, memory, and processor to receive the second network service by providing signed second validation data based at least in part on authenticating second biometric information, as discussed elsewhere herein.

Process 500 may include additional aspects, such as any single aspect or any combination of aspects described below and/or in connection with one or more other processes described elsewhere herein.

In a first aspect, in process 500, providing the signed first validation data includes signing the first validation data by utilizing a signature key and providing the signed second validation data includes signing the second validation data by utilizing the signature key.

In a second aspect, alone or in combination with the first aspect, in process 500, authenticating the first biometric information includes comparing the first biometric information with stored authentic biometric information and authenticating the second biometric information includes comparing the second biometric information with the stored authentic biometric information.

In a third aspect, alone or in combination with the first through second aspects, in process 500, authenticating the first biometric information includes determining that the first biometric information matches stored authentic biometric information and authenticating the second biometric information includes determining that the second biometric information matches the stored authentic biometric information.

In a fourth aspect, alone or in combination with the first through third aspects, in process 500, the first validation data is different from the second validation data.

In a fifth aspect, alone or in combination with the first through fourth aspects, in process 500, the first validation data or the second validation data includes an alphanumeric string or a one-time credential.

In a sixth aspect, alone or in combination with the first through fifth aspects, process 500 may include transmitting authentication information including an installation identifier associated with a client application installed on the user device to enable reception of the first validation data, the client application associated with reception of network services.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with optimized access in a service environment, according to various aspects of the present disclosure. In some aspects, the process 400 may be performed by a memory and/or a processor/controller (e.g., processor 720) associated with a user device (e.g., user device 102) executing a client application. As shown by reference numeral 610, process 600 may include receiving, by a user device, validation data based at least in part on transmitting a first service request to receive a first network service. For instance, the user device may utilize an associated communication interface (e.g., communication interface 770) with the associated processor/controller to receive validation data based at least in part on transmitting a first service request to receive a first network service, as discussed elsewhere herein.

As shown by reference numeral 620, process 600 may include receiving, by the user device, the first network service based at least in part on signing the validation data using a signature key and on authenticating first biometric information. For instance, the user device may utilize the associated communication interface and associated processor/controller to receive the first network service based at least in part on signing the validation data using a signature key and on authenticating first biometric information, as discussed elsewhere herein.

As shown by reference numeral 630, process 600 may include transmitting, by the user device while receiving the first service, a second service request to receive encrypted content. For instance, the user device may utilize the associated communication interface and processor/controller to transmit, while receiving the first service, a second service request to receive encrypted content, as discussed elsewhere herein.

As shown by reference numeral 640, process 600 may include decrypting, by the user device, the encrypted content based at least in part on utilizing a master key and on authenticating second biometric information. For instance, the user device may utilize the associated processor/controller to decrypt the encrypted content based at least in part on utilizing a master key and on authenticating second biometric information, as discussed elsewhere herein.

Process 600 may include additional aspects, such as any single aspect or any combination of aspects described below and/or in connection with one or more other processes described elsewhere herein.

In a first aspect, in process 600, authenticating the first biometric information includes authenticating the first biometric information at a time associated with utilizing the signature key, and authenticating the second biometric information includes authenticating the second biometric information at a time associated with utilizing the master key.

In a second aspect, alone or in combination with the first aspect, in process 600, authenticating the first biometric information includes authenticating the first biometric information prior to signing the first validation data, and authenticating the second biometric information includes authenticating the second biometric information prior to decrypting a device-specific private key utilized to decrypt the encrypted content.

In a third aspect, alone or in combination with the first through second aspects, in process 600, authenticating the first biometric information includes comparing the first biometric information with stored authentic biometric information, and authenticating the second biometric information includes comparing the second biometric information with the stored authentic biometric information.

In a fourth aspect, alone or in combination with the first through third aspects, in process 600, authenticating the first biometric information includes determining that the first biometric information matches stored authentic biometric information, and authenticating the second biometric information includes determining that the second biometric information matches the stored authentic biometric information.

In a fifth aspect, alone or in combination with the first through fourth aspects, in process 600, utilizing the master key includes utilizing the master key to decrypt a device-specific private key specific to the user device, and decrypting the encrypted content based at least in part on utilizing the device-specific private key.

In a sixth aspect, alone or in combination with the first through fifth aspects, in process 600, the validation data includes an alphanumeric string or a one-time credential.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of example devices 700, according to various aspects of the present disclosure. In some aspects, the example devices 700 may form part of or implement the systems, environments, infrastructures, components, or the like described elsewhere herein and may be used to perform the example processes described elsewhere herein. The example devices 700 may include a universal bus 710 communicatively coupling a processor 720, a memory 730, a storage component 740, an input component 750, an output component 760, and a communication interface 770.

Bus 710 may include a component that permits communication among multiple components of a device 700. Processor 720 may be implemented in hardware, firmware, and/or a combination of hardware and software. Processor 720 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 720 may include one or more processors capable of being programmed to perform a function. Memory 730 may include a random access memory (RAM), a read only memory (ROM), and/or another type of dynamic or static storage device (e.g., a flash memory, a magnetic memory, and/or an optical memory) that stores information and/or instructions for use by processor 720.

Storage component 740 may store information and/or software related to the operation and use of a device 700. For example, storage component 740 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 750 may include a component that permits a device 700 to receive information, such as via user input (e.g., a touch screen display, a keyboard, a keypad, a mouse, a button, a switch, and/or a microphone). Additionally, or alternatively, input component 750 may include a component for determining location (e.g., a global positioning system (GPS) component) and/or a sensor (e.g., an accelerometer, a gyroscope, an actuator, another type of positional or environmental sensor, and/or the like). Output component 760 may include a component that provides output information from device 700 (via, for example, a display, a speaker, a haptic feedback component, an audio or visual indicator, and/or the like).

Communication interface 770 may include a transceiver-like component (e.g., a transceiver, a separate receiver, a separate transmitter, and/or the like) that enables a device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, and/or the like.

A device 700 may perform one or more processes described elsewhere herein. A device 700 may perform these processes based on processor 720 executing software instructions stored by a non-transitory computer-readable medium, such as memory 730 and/or storage component 740. As used herein, the term "computer-readable medium" may refer to a non-transitory memory device. A memory device may include memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 7 are provided as an example. In practice, a device 700 may include additional components, fewer components, different components, or differently arranged components than those shown in FIG. 7. Additionally, or alternatively, a set of components (e.g., one or more components) of a device 700 may perform one or more functions described as being performed by another set of components of a device 700.

As indicated above, FIG. 7 is provided as an example. Other examples may differ from what is described with regard to FIG. 7.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

configuring, by an infrastructure device, a user device to receive validation data based at least in part on transmitting a first service request to receive a first network service;

configuring, by the infrastructure device, the user device to receive the first network service based at least in part on signing the validation data using a signature key and on authenticating first biometric information;

configuring, by the infrastructure device, the user device to transmit, while receiving the first service, a second service request to receive encrypted content; and configuring, by the infrastructure device, the user device to decrypt the encrypted content based at least in part on utilizing a master key and on authenticating second biometric information.

2. The method of claim 1, wherein configuring the user device to authenticate the first biometric information includes configuring the user device to authenticate the first biometric information at a time associated with utilizing the signature key, and configuring the user device to authenticate the second biometric information includes configuring the user device to authenticate the second biometric information at a time associated with utilizing the master key.

3. The method of claim 1, wherein configuring the user device to authenticate the first biometric information includes configuring the user device to authenticate the first biometric information prior to signing the first validation data, and configuring the user device to authenticate the second biometric information includes configuring the user device to authenticate the second biometric information prior to decrypting a device-specific private key utilized to decrypt the encrypted content.

4. The method of claim 1, wherein configuring the user device to authenticate the first biometric information includes configuring the user device to compare the first biometric information with stored authentic biometric information, and configuring the user device to authenticate the second biometric information includes configuring the user device to compare the second biometric information with the stored authentic biometric information.

5. The method of claim 1, wherein configuring the user device to authenticate the first biometric information includes configuring the user device to determine that the first biometric information matches stored authentic biometric information, and configuring the user device to authenticate the second biometric information includes configuring the user device to determine that the second biometric information matches the stored authentic biometric information.

6. The method of claim 1, wherein configuring the user device to utilize the master key includes configuring the user device to utilize the master key to decrypt a device-specific private key specific to the user device, and to decrypt the encrypted content based at least in part on utilizing the device-specific private key.

7. The method of claim 1, wherein the validation data includes an alphanumeric string or a one-time credential.

8. A infrastructure device, comprising:

a memory; and a processor communicatively coupled to the memory, the memory and the processor being configured to:

configure a user device to receive validation data based at least in part on transmitting a first service request to receive a first network service;

configure the user device to receive the first network service based at least in part on signing the validation data using a signature key and on authenticating first biometric information;

configure the user device to transmit, while receiving the first service, a second service request to receive encrypted content; and configure the user device to decrypt the encrypted content based at least in part on utilizing a master key and on authenticating second biometric information.

9. The infrastructure device of claim 8, wherein to configure the user device to authenticate the first biometric information, the memory and the processor are configured to configure the user device to authenticate the first biometric information at a time associated with utilizing the signature key, and to configure the user device to authenticate the second biometric information, the memory and the processor are configured to configure the user device to authenticate the second biometric information at a time associated with utilizing the master key.

10. The infrastructure device of claim 8, wherein to configure the user device to authenticate the first biometric information, the memory and the processor are configured to configure the user device to authenticate the first biometric information prior to signing the first validation data, and to configure the user device to authenticate the second biometric information, the memory and the processor are configured to configure the user device to authenticate the second biometric information prior to decrypting a device-specific private key utilized to decrypt the encrypted content.

11. The infrastructure device of claim 8, wherein to configure the user device to authenticate the first biometric information, the memory and the processor are configured to configure the user device to compare the first biometric information with stored authentic biometric information, and to configure the user device to authenticate the second biometric information, the memory and the processor are configured to configure the user device to compare the second biometric information with the stored authentic biometric information.

12. The infrastructure device of claim 8, wherein to configure the user device to authenticate the first biometric information, the memory and the processor are configured to configure the user device to determine that the first biometric information matches stored authentic biometric information, and to configure the user device to authenticate the second biometric information, the memory and the processor are configured to configure the user device to determine that the second biometric information matches the stored authentic biometric information.

13. The infrastructure device of claim 8, wherein to configure the user device to utilize the master key, the memory and the processor are configured to configure the user device to utilize the master key to decrypt a device-specific private key specific to the user device, and to configure the user device to decrypt the encrypted content, the memory and the processor are configured to configure the user device to utilize the device-specific private key.

14. The infrastructure device of claim 8, wherein the validation data includes an alphanumeric string or a one-time credential.

15. A non-transitory computer-readable medium configured to store instructions, which when executed by a processor associated with an infrastructure device, configure the processor to:

configure a user device to receive validation data based at least in part on transmitting a first service request to receive a first network service;

configure the user device to receive the first network service based at least in part on signing the validation data using a signature key and on authenticating first biometric information;

configure the user device to transmit, while receiving the first service, a second service request to receive encrypted content; and configure the user device to decrypt the encrypted content based at least in part on utilizing a master key and on authenticating second biometric information.

16. The non-transitory computer-readable medium of claim 15, wherein to configure the user device to authenticate the first biometric information, the processor is configured to configure the user device to authenticate the first biometric information at a time associated with utilizing the signature key, and to configure the user device to authenticate the second biometric information, the processor is configured to configure the user device to authenticate the second biometric information at a time associated with utilizing the master key.

17. The non-transitory computer-readable medium of claim 15, wherein to configure the user device to authenticate the first biometric information, the processor is configured to configure the user device to authenticate the first biometric information prior to signing the first validation data, and to configure the user device to authenticate the second biometric information, the processor is configured to configure the user device to authenticate the second biometric information prior to decrypting a device-specific private key utilized to decrypt the encrypted content.

18. The non-transitory computer-readable medium of claim 15, wherein to configure the user device to authenticate the first biometric information, the processor is configured to configure the user device to compare the first biometric information with stored authentic biometric information, and to configure the user device to authenticate the second biometric information, the processor is configured to configure the user device to compare the second biometric information with the stored authentic biometric information.

19. The non-transitory computer-readable medium of claim 15, wherein to configure the user device to authenticate the first biometric information, the processor is configured to configure the user device to determine that the first biometric information matches stored authentic biometric information, and to configure the user device to authenticate the second biometric information, the processor is configured to configure the user device to determine that the second biometric information matches the stored authentic biometric information.

20. The non-transitory computer-readable medium of claim 15, wherein to configure the user device to utilize the master key, the processor is configured to configure the user device to utilize the master key to decrypt a device-specific private key specific to the user device, and to configure the user device to decrypt the encrypted content, the processor is configured to configure the user device to utilize the device-specific private key.

* * * * *